(12) United States Patent
Cardinali et al.

(10) Patent No.: US 12,478,738 B2
(45) Date of Patent: Nov. 25, 2025

(54) METHODS AND SYSTEMS FOR STERILIZING SEALED COMPONENTS OF A DRUG DELIVERY DEVICE

(71) Applicant: INSULET CORPORATION, Acton, MA (US)

(72) Inventors: Steven Cardinali, Tewksbury, MA (US); Kyle Breingan, Lowell, MA (US)

(73) Assignee: INSULET CORPORATION, Acton, MA (US)

( * ) Notice: Subject to any disclaimer, the term of this patent is extended or adjusted under 35 U.S.C. 154(b) by 596 days.

(21) Appl. No.: 18/052,287

(22) Filed: Nov. 3, 2022

(65) Prior Publication Data

US 2023/0136536 A1    May 4, 2023

Related U.S. Application Data

(60) Provisional application No. 63/275,745, filed on Nov. 4, 2021.

(51) Int. Cl.
*A61M 5/315* (2006.01)
*A61M 5/142* (2006.01)
*A61M 5/168* (2006.01)

(52) U.S. Cl.
CPC .... *A61M 5/31513* (2013.01); *A61M 5/14244* (2013.01); *A61M 5/16877* (2013.01)

(58) Field of Classification Search
CPC .......... A61M 5/31513; A61M 5/14244; A61M 5/16877; A61M 5/31515
See application file for complete search history.

(56) References Cited

U.S. PATENT DOCUMENTS 2,833,007 A    5/1958    Messer et al.
4,307,713 A    12/1981   Galkin et al.
(Continued)

FOREIGN PATENT DOCUMENTS

CN    1898131 A    1/2007
EP    2099384 A1   9/2009
(Continued)

OTHER PUBLICATIONS

International Search Report and Written Opinion for PCT/US18/52468, mailed on Feb. 26, 2019, 16 pages.
(Continued)

*Primary Examiner* — Dung T Ulsh
(74) *Attorney, Agent, or Firm* — GOODWIN PROCTER LLP

(57) ABSTRACT

Fluid delivery devices with sterilization management systems are described. For example, a fluid delivery device may include a device region fluidically coupled to a fluid path, the fluid path having at least one opening to allow a sterilization source to flow into the device region, an exposure valve arranged in the fluid path and configured to seal or unseal the at least one opening, the exposure valve comprising a piston having a sealing component arranged at a first end facing the at least one opening, a biasing element configured to contact a second end of the piston, arranged opposite the first end, to bias the piston toward the at least one opening, an activation element configured to be activated by a stimulus to move the piston to a sterilization position during a sterilization process and deactivated responsive to removal of the stimulus to cause the piston to be moved into a sealing position, the at least one opening is unsealed when the piston is in the sterilization position to allow a sterilization source to sterilize the device region via the fluid path. Other embodiments are described.

20 Claims, 5 Drawing Sheets

(56) References Cited

U.S. PATENT DOCUMENTS

| | | |
|---|---|---|
| 4,416,663 A | 11/1983 | Hall |
| 4,801,957 A | 1/1989 | Vandemoere |
| 4,850,954 A | 7/1989 | Charvin |
| 4,882,600 A | 11/1989 | Van de Moere |
| 4,973,998 A | 11/1990 | Gates |
| 5,045,871 A | 9/1991 | Reinholdson |
| 5,239,326 A | 8/1993 | Takai |
| 5,452,033 A | 9/1995 | Balling et al. |
| 5,576,781 A | 11/1996 | Deleeuw |
| 5,899,882 A | 5/1999 | Waksman et al. |
| 6,164,044 A | 12/2000 | Porfano et al. |
| 6,685,452 B2 | 2/2004 | Christiansen et al. |
| 6,767,319 B2 | 7/2004 | Reilly et al. |
| 7,182,726 B2 | 2/2007 | Williams et al. |
| 7,303,073 B2 | 12/2007 | Raynal-Olive et al. |
| 8,056,719 B2 | 11/2011 | Porret et al. |
| 8,105,282 B2 | 1/2012 | Susi et al. |
| 8,461,561 B2 | 6/2013 | Freeman et al. |
| 8,727,117 B2 | 5/2014 | Maasarani |
| 8,747,739 B2 | 6/2014 | Parker et al. |
| 9,005,166 B2 | 4/2015 | Uber, III et al. |
| 9,248,229 B2 | 2/2016 | Devouassoux et al. |
| 9,427,710 B2 | 8/2016 | Jansen |
| 9,555,911 B2 | 1/2017 | Pawlowski et al. |
| 9,598,195 B2 | 3/2017 | Deutschle et al. |
| 9,862,519 B2 | 1/2018 | Deutschle et al. |
| 10,086,131 B2 | 10/2018 | Okihara |
| 10,342,926 B2 | 7/2019 | Nazzaro et al. |
| 2004/0139698 A1 | 7/2004 | Grifols |
| 2005/0133729 A1 | 6/2005 | Woodworth et al. |
| 2005/0147527 A1 | 7/2005 | Brown et al. |
| 2005/0222539 A1 | 10/2005 | Gonzales et al. |
| 2006/0086909 A1 | 4/2006 | Schaber |
| 2009/0254041 A1 | 10/2009 | Krag et al. |
| 2014/0163664 A1 | 6/2014 | Goldsmith |
| 2015/0057613 A1* | 2/2015 | Clemente .......... A61M 5/14566 604/244 |
| 2015/0078961 A1 | 3/2015 | Opie |
| 2015/0196720 A1 | 7/2015 | Okihara et al. |
| 2016/0262984 A1 | 9/2016 | Arnott et al. |
| 2017/0197028 A1 | 7/2017 | Goldsmith |

FOREIGN PATENT DOCUMENTS

| | | |
|---|---|---|
| ES | 2559866 T3 | 2/2016 |
| GB | 2461086 A | 12/2009 |
| JP | 1997010282 A | 1/1997 |
| JP | 2002126039 A | 5/2002 |
| JP | 2007516775 A | 6/2007 |
| WO | 2007039930 A1 | 4/2007 |
| WO | 2017089289 A1 | 6/2017 |
| WO | 2017205816 A1 | 11/2017 |
| WO | 2018075851 A2 | 4/2018 |

OTHER PUBLICATIONS

International Search Report and Written Opinion for PCT/US2017/061095, mailed on Feb. 20, 2018, 8 pages.

International Preliminary Report on Patentability for the International Patent Application No. PCT/US2017/061095, dated May 23, 2019, 7 pages.

* cited by examiner

200

METHODS AND SYSTEMS FOR STERILIZING SEALED COMPONENTS OF A DRUG DELIVERY DEVICE

RELATED APPLICATIONS

This application claims the benefit of U.S. Provisional Patent Application No. 63/275,745, filed Nov. 4, 2021, the contents of which are incorporated herein by reference in their entirety.

FIELD OF THE INVENTION

The present disclosure generally relates to a drug delivery system, and, in particular, improved methods and systems for sterilizing sealed components of a drug delivery system.

BACKGROUND

Healthcare providers may prescribe patients fluid delivery devices for delivering fluids, such as liquid medicaments, as part of a treatment regimen. Non-limiting examples of medicaments may include chemotherapy drugs, hormones (for instance, insulin), pain relief medications, and other types of liquid-based drugs. Fluid delivery devices need to be sterilized before they are sent to the patient. Methods of sterilization may include exposing the fluid delivery device and/or components thereof to sterilization conditions, which may include sterilization fluids, gases, and/or temperatures. Typically, the efficient sterilization techniques involve sterilizing the assembled fluid delivery device, for example, after packaging and prior to shipment. However, certain components (for instance, fluid pumps, fluid reservoirs, and/or the like) and/or regions of fluid delivery devices are designed to be sealed off from the external environment. Accordingly, system design may be in conflict with efficient sterilization processes. In addition, because the systems are typically fully assembled at the time of sterilization, it is not practical to manually disassemble or otherwise expose the sealed components to the sterilization conditions.

It is with considerations of these and other challenges in mind that improvements such as disclosed in the present disclosure may be useful.

Figure 1:
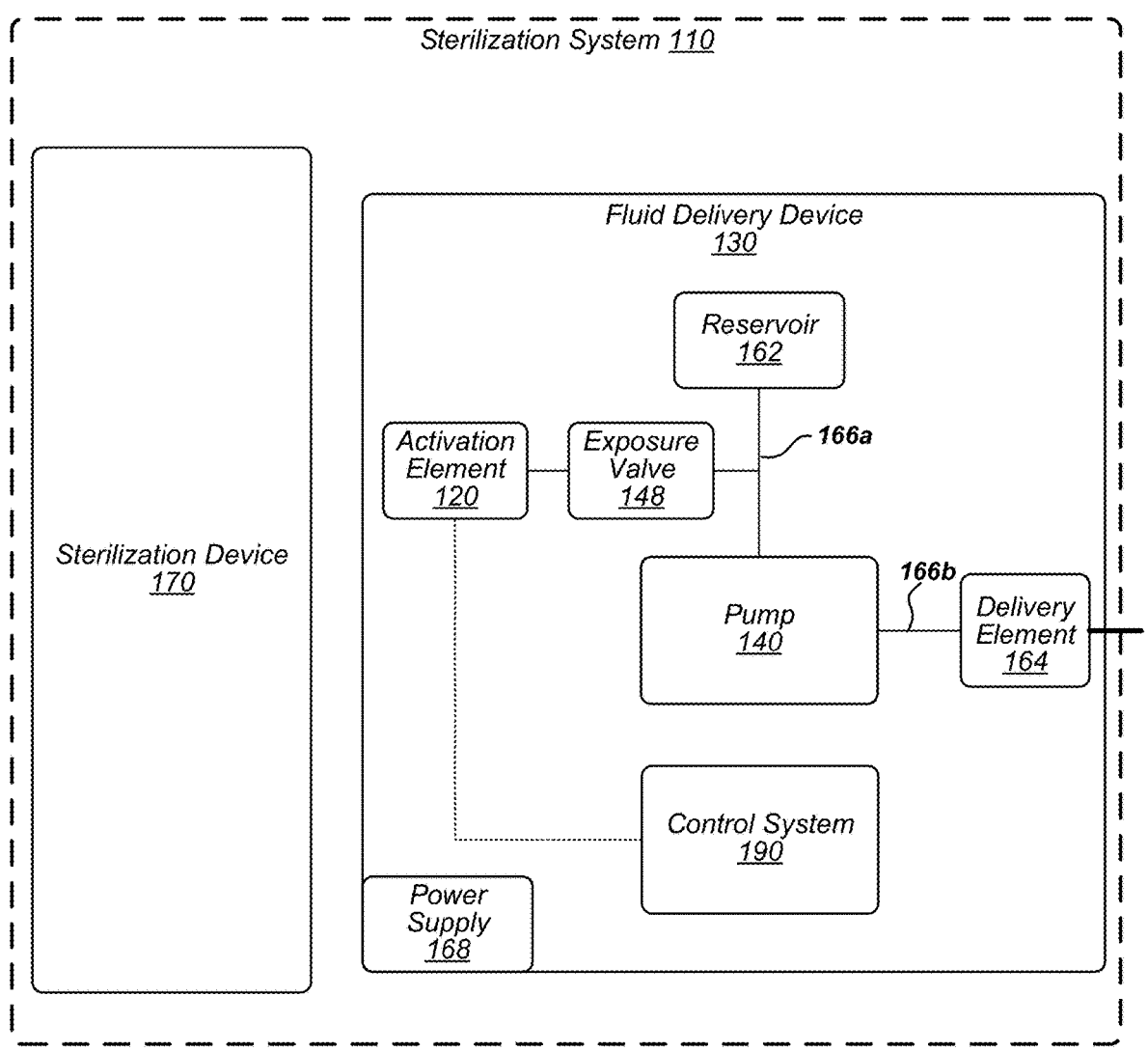
FIG. 1 illustrates a first exemplary embodiment of an operating environment in accordance with the present disclosure.

The drawings are not necessarily to scale. The drawings are merely representations, not intended to portray specific parameters of the disclosure. The drawings are intended to depict example embodiments of the disclosure, and therefore should not be considered as limiting in scope. In the drawings, like numbering represents like elements.

DETAILED DESCRIPTION

The described technology generally relates to techniques and systems for sterilizing fluid delivery devices. In general, a sterilization process may include exposing components of the fluid delivery device to a sterilization source. The fluid delivery device may have a sealed region (or component) that is closed off from being contacted by the sterilization source. Fluid delivery devices according to some embodiments may include an activation component configured to allow the sealed region to be exposed or vented to the sterilization source during the sterilization process, then to be re-sealed after the sterilization process is complete so that the sealed region is sealed during use of the fluid delivery device by a user.

In some embodiments, the sterilization process may include exposing the activation component to an activation stimulus to cause activation of an exposure valve. Activation of the exposure valve may unseal the sealed region. Responsive to removal of the activation stimuli (or, in addition or in the alternative, exposure to a second stimulus), the activation component may become deactivated, thereby causing deactivation (or closure) of the exposure valve. Closure of the exposure valve may re-seal the sealed region. In some embodiments, once the sealed region has been re-sealed, it may not be exposed again. For example, the activation component may not be re-activated, the exposure valve may not be re-opened, re-activation of the activation component may not open the exposure valve, combinations thereof, and/or the like. Accordingly, the sealed region may be exposed for sterilization, then re-sealed for subsequent use.

In one non-limiting example, a fluid delivery device may be an automated insulin delivery (AID) device or pump. In general, insulin pumps need to be sterilized before being sent to the patient. The most common method of sterilization is Ethylene Oxide (EO) gas exposure. In order for the gas-based sterilization method to work, every part of the product needs to be accessible by gas. This means that no part of the system can be sealed off from the external environment. Certain system designs (for example, pumps, reservoirs, and/or the like) that have major advantages in other areas require the system to be sealed off from the external environment during system function. This puts these designs and advantages at odds with sterilization simplicity and efficiency. In addition, the sealed parts of conventional systems normally cannot be opened just for a sterilization step. For example, fluid delivery systems are typically fully assembled and in packaging during sterilization, so there can be no external human interference to expose the sealed parts during the sterilization process.

In one embodiment, an activation component may be or may include a shape-memory allow (SMA) wire. Non-limiting examples of SMA wires may include nickel-titanium wires, nitinol wires, alloys thereof, and/or the like. Some embodiments may leverage an SMA wire that has a transition/activation temperature that is above a sterilization temperature (for instance, about ~130° F. or greater) and is not activated at normal assembly and transportation temperatures (for instance, about ~100° F. maximum). This allows the SMA wire to open and unseal the system only during the elevated temperatures of sterilization. After the temperature cools, the system may be locked into a position so that an elevated temperature would never allow it to open again.

Accordingly, embodiments may provide multiple technological advantages over conventional systems. In one non-limiting technological advantage, embodiments may provide techniques and systems to facilitate efficient sterilization of a fluid delivery device, including sealed components thereof, that is not available using conventional systems. In another non-limiting technological advantage, embodiments may provide techniques and systems to allow for the selective exposure of sealed device components during specified events, times and/or conditions, such as sterilization. In another non-limiting technological advantage, embodiments may provide techniques and systems to allow for the permanent re-sealing of exposed sealed components such that similar conditions will not cause re-exposure of sealed components (e.g., exposure to a sterilization temperature in a first instance will expose a sealed component, but exposure to the sterilization temperature in a second instance will not lead to exposure of the sealed component).

Other embodiments and technological advantages are contemplated in the present disclosure.

FIG. 1 illustrates an example of an operating environment 100 that may be representative of some embodiments. As shown in FIG. 1, operating environment 100 may include a sterilization system 110. In various embodiments, sterilization system 110 may include a sterilization device 170 that may be configured to expose a fluid delivery device 160 to sterilization conditions. In some embodiments, sterilization conditions may include exposure to any type of sterilization source such as a fluid, temperature, pressure, light, and/or the like that may be used during a sterilization process to sterilize fluid delivery device. Non-limiting examples of sterilization conditions may include a sterilization temperature (for example, greater than 100° F., greater than 130° F., greater than 150° F., greater than 200° F., greater than 250° F., greater than 300° F., and any range or value between any of these values (including endpoints)), a sterilization fluid (for example, EtO gas, steam, vaporized hydrogen peroxide, vaporized chlorine dioxide, vaporized peracetic acid, nitrogen dioxide, and/or the like), radiation (for example, gamma radiation), and/or the like.

Fluid delivery device 130 may be or may include a wearable automatic fluid delivery device configured to be directly coupled to a patient during use, for example, directly attached to the skin of the user via an adhesive and/or other attachment component. In some embodiments, fluid delivery device 130 may be or may include a medicament delivery device configured to deliver a liquid medicament, drug, therapeutic agent, or other medical fluid to a patient. Non-limiting examples of medicaments may include insulin, glucagon or a glucagon-like peptide, pain relief drugs, hormones, blood pressure medicines, morphine, methadone, chemotherapy drugs, proteins, antibodies, and/or the like.

In some embodiments, fluid delivery device 130 may be or may include an automatic insulin delivery (AID) device configured to deliver insulin (and/or other medication) to a patient. For example, fluid delivery device 130 may be or may include a device the same or similar to an OmniPod® device or system provided by Insulet Corporation of Acton, Massachusetts, United States, for example, as described in U.S. Pat. Nos. 7,303,549; 7,137,964; and/or 6,740,059, each of which is incorporated herein by reference in its entirety. Although an AID device and insulin are used in examples in the present disclosure, embodiments are not so limited, as fluid delivery device 130 may be or may include a device capable of storing and delivering any fluid including, without limitation, therapeutic agent, drug, medicine, hormone, protein, antibody, and/or the like.

Fluid delivery device 130 may include a delivery system having a number of components to facilitate automated delivery of a fluid to a patient, including, without limitation, a reservoir 162 for storing the fluid, a pump 140 for transferring the fluid from reservoir 162, through a fluid path or conduit 166, and into the body of the patient, and/or a power supply 168. Fluid delivery device 130 may include at least one delivery element 164, such as a needle and/or cannula, configured to be inserted into the skin of the patient to operate as a conduit between reservoir 162 and the patient. Embodiments are not limited in this context, for example, as delivery system 162 may include more or less components. In some embodiments, fluid path 166 may include various segments, such as a segment 166a between reservoir 162 and pump 140 and a segment 166b between pump 140 and delivery element 164.

In some embodiments, fluid delivery device 130 may include a sterilization management system configured to manage sterilization of portions of fluid delivery device, such as sealed components that require exposure during a sterilization process. In the example depicted in FIG. 1, the sterilization management system may operate to sterilize fluid path 166a of fluid delivery device 130 (e.g., a fluid path between reservoir 162 and pump 140). In some embodiments, sterilization management system may include an activation element 120 and an exposure valve 148. In various embodiments, activation element 120 may be activated by one or more activation stimuli, such as temperature, a current, light, radiation, sound, electrical signals, wireless signals, and/or the like. In some embodiments, activation element 120 may be or may include an SMA wire activated via exposure to an activation temperature, such as a temperature greater than 130° F. The activation temperature may have various values according to some embodiments, such as 100° F., 110° F., 120° F., 130° F., 140° F., 150° F., 160° F., 170° F., 180° F., 190° F., 200° F., 200° F. or higher, and/or any value or range between any two of these values (including endpoints). Activation element 120 may be operably coupled to exposure valve 148 such that activation of activation element 120 may open exposure valve 148 to expose, for example, path 166a.

In some embodiments, fluid delivery device 130 may include a control system 190. In various embodiments, control system 190 may be a logic device or system and may include hardware (for instance, processors, memory, sensors, circuits, and/or the like) and/or software. For example, control system 190 may include discrete, specialized logic and/or components, an application-specific integrated circuit, a microcontroller or processor that executes software instructions, firmware, programming instructions stored in memory, or any combination thereof. Control system 190 may operate to implement various functions according to some embodiments, such as controlling activation element 120. For instance, control system 190 may monitor for (or the absence of) sterilization stimuli (for example, via one or more sensors operatively coupled to control system 190), such as a temperature being over a threshold value, light, radiation, fluid flow, and/or the like and may provide a signal to activate (or deactivate) activation element 120.

Figure 2:
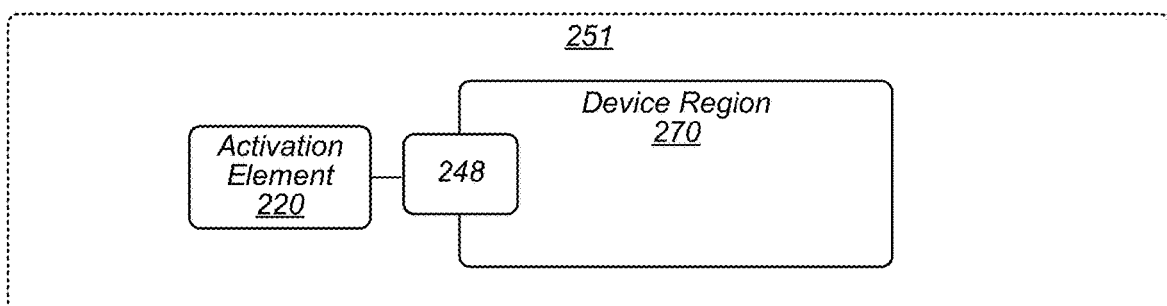
FIG. 2 illustrates a second exemplary embodiment of an operating environment in accordance with the present disclosure.
Figure 2:
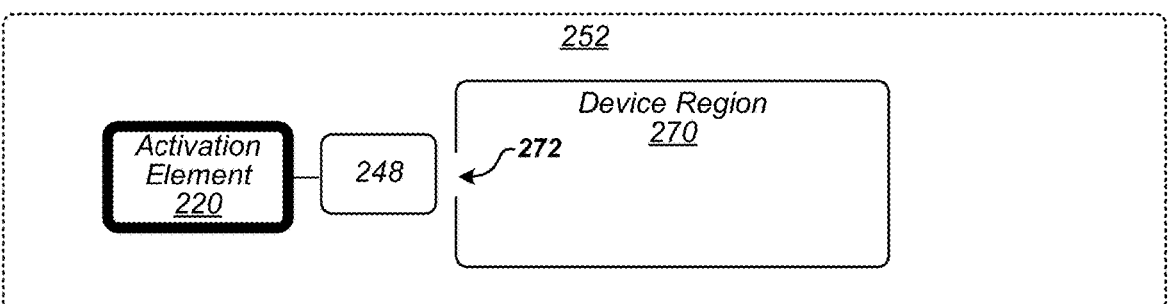
Figure 2:
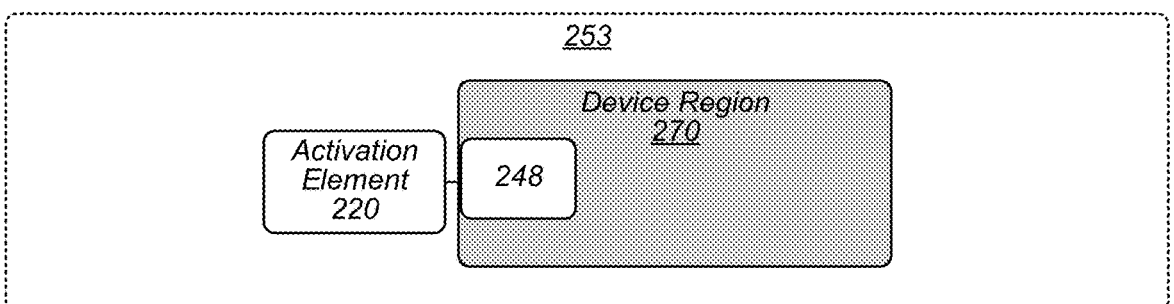

FIG. 2 illustrates an example of an operating environment 200 that may be representative of some embodiments. As shown in FIG. 2, operating environment 200 may include a device region 270 associated with an exposure valve 248. In some embodiments, exposure valve 248 may be operably coupled to an activation element 220.

In a first state 251 (an "initial state" or a "pre-sterilization state"), device region 270 may be sealed from the environment. In one non-limiting example, device region 270 may be a sealed fluid path of an AID device, sealed between a pump and a reservoir (for instance, a sterilization source would not be able to reach device region 270 in first state 251). The AID device may be fully assembled (and packaged) and ready for sterilization.

In a second state 252 (a "sterilization state"), activation element 220 may be exposed to an activation stimulus. In one non-limiting example, an activation stimulus may be an elevated temperature, for example, used as part of the sterilization process. In some embodiments, activation element 220 may be an SMA wire that is activated (for example, changes shape, length, or other physical property) via exposure to a certain temperature range, electrical signal, or other stimulus. In other embodiments, the activation stimuli (for instance, a temperature over a threshold range) may cause activation of a circuit that provides an electrical signal (for instance, a threshold voltage, current, and/or the like) to activate activation element 220. For example, a sensor (not shown) within a fluid delivery device may determine an elevated temperature and an activation current may be transmitted to activation element 220 (for example, via control system 190 and/or the sensor).

Exposure valve 248 is activated or "opened" in second state 252. For example, activation element 220 may be deformed, moved, or otherwise activated responsive to exposure to the activation stimulus. Activation element 220 may be operably coupled to exposure valve 248 such that movement of activation element 220 responsive to the exposure to the activation stimulus may cause a corresponding movement or other change in exposure valve 248 to open a vent 272 or other opening. Sterilization source may enter device region 270 via vent 272. During second state 252, the sterilization process may expose device region 270 to the sterilization source or sources, such as heat, fluid or gas (EO), radiation (gamma), and/or the like.

In a third state 253 (the "closed state" or the "sealed state"), activation element 220 may be deactivated. In some embodiments, activation element 220 may be deactivated via removal of the activation stimulus and/or exposure to a deactivation stimulus (for instance, an electrical signal). In the third state, device region 270 has been sterilized. Deactivation of activation element 220 may cause exposure valve 248 to permanently close vent 272. For example, re-exposure of activation element 220 to the activation stimulus will not open exposure valve 248 to expose device region 270 via vent 272.

Accordingly, some embodiments may facilitate a sterilization process to sterilize sealed components by temporarily opening sealed components or regions for exposure to sterilization conditions, and then permanently sealing (or re-sealing) the sealed components or regions so that they may maintain a hermetic seal during device operation.

Figure 3:
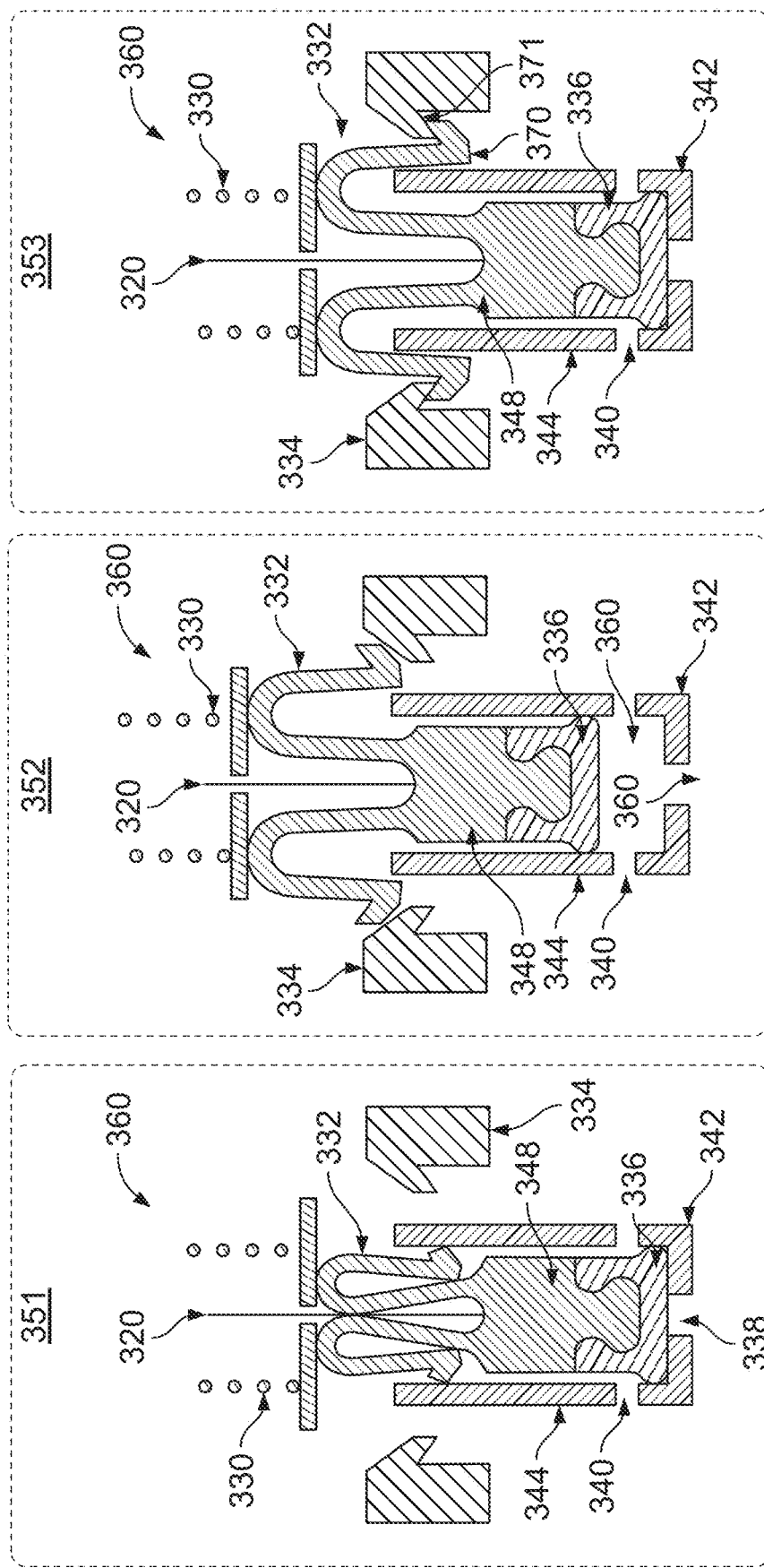
FIG. 3 illustrates a first sterilization process in accordance with the present disclosure.

FIG. 3 illustrates a first sterilization process in accordance with the present disclosure. As shown in FIG. 3, an exposure valve or valve system 360 may be configured to allow for selective exposure of a device region or component during a sterilization process and to be closed or sealed after completion of the sterilization process. In some embodiments, exposure valve 360 may be arranged in a fluid path (for instance, path 166a) or device component (for instance, a wall of a reservoir, pump, and/or housing thereof).

A piston 348 may be arranged within a cylinder 344. Piston 348 may be connected to or integrated with a locking element 332, such as detent arms, at a first or locking end and a sealing component 336 at a second or sealing end, opposite the first end. Sealing component 336 may be formed of rubber, silicone, a polymer, and/or other materials suitable for forming a hermetic seal. An activation element 350, such as an SMA wire, may be operatively coupled to piston 348. Cylinder 344 may include various openings, such as vents 340 (for example, air vents to atmosphere) and/or a fluid port 338 fluidically coupled to a fluid path (for instance, path 166a or 166b). Openings 338, 340 may provide a fluid path to the device region being sealed by exposure valve 360. Accordingly, if the openings are sealed off by sealing component 336, then the device region associated with exposure valve is also sealed from fluid.

In a first or pre-sterilization stage 351, piston 348 is arranged within cylinder 344 such that sealing component 336 forms a seal with openings, including vents 340 and/or fluid port 338, and detent arms 332 are arranged within cylinder 344. Detent arms 332 may be biased against an inner wall of cylinder 344.

In a sterilization stage 352, activation element 320 may be activated to pull piston 348 in an unsealing direction or in a direction that is away from openings 338, 340 to place piston in a sterilization position. In some embodiments, activation element 320 may be activated by one or more activation stimuli, such as exposure to a temperature over a threshold value, an electrical current or signal, and/or the like. When piston 348 is pulled out of cylinder 344, detent arms 332 may expand and openings 338, 340 may be unsealed, allowing fluid or other sterilization sources (for instance, light, radiation, and/or the like) to enter the device region associated with exposure system 360. In various embodiments, activation element 320 may remain activated during sterilization stage 352 to hold or otherwise maintain piston 348 in a position that keeps openings 338, 348 open. For example, a device associated with exposure valve 360 may be exposed to a sterilization temperature (for instance, 130° F. or higher) during sterilization stage 352, which causes activation element 320 to remain activated (for example, either directly or via an electrical signal triggered by the sterilization temperature). During sterilization stage 352, the device associated with exposure valve 360 may be exposed to a sterilization source, such as a sterilization fluid (EO), radiation, light, and/or the like, that may enter the device region via one or more of openings 338, 340 to sterilize the device region.

In a sealing stage 353, activation element 320 may be deactivated, for instance, via removal of a heat source, transmission of an electrical signal, and/or the like. A biasing component 330, such as a spring, may be biased against piston 348 in a sealing direction (for instance, toward openings 338, 340). During sterilization stage 352, activation element 320 may maintain piston 348 with a force that is greater than a biasing force applied by biasing component 330 against piston 348 to keep openings 338, 340 open. When activation element 320 is deactivated and stops holding piston 348, biasing component 330 pushes piston 348 in a sealing direction toward openings 338, 340 until sealing component 336 forms (or re-forms) a seal with openings 338, 340. Accordingly, in the sealing stage 353, the device region associated with exposure valve 360 is re-sealed as in pre-sterilization stage 351.

Detent arms 332 may have detent locking flanges or elements 370 configured to engage a corresponding device locking flanges, hooks, or elements 371. Biasing component 330 may push piston 348 downward in a sealing direction (for instance, toward openings 338, 340), such that detent locking flanges 370 are arranged to engage device locking flanges 371 to prevent piston 348 from being moved in an unsealing direction away from openings 338, 340. Accordingly, piston 348 may not be moved in a manner that exposes openings 338, 340, and the device region associated with exposure valve 360 is permanently re-sealed after sterilization.

In this manner, some embodiments may provide a one-time use mechanism for allowing sterilization of a device. In one non-limiting example, a valve assembly may include two detent arms entrapped within a cylinder. When an SMA wire is heated and activates, the valve assembly is pulled at least partially out of the cylinder so that the seal and detent arms are pulled back. The detent arms are able to escape the cylinder and the air vents expose the system. Once the SMA wire cools, a return spring pushes the valve assembly back into place sealing the air vents. The detent arms get locked behind a second set of inescapable retaining features.

Figure 4:
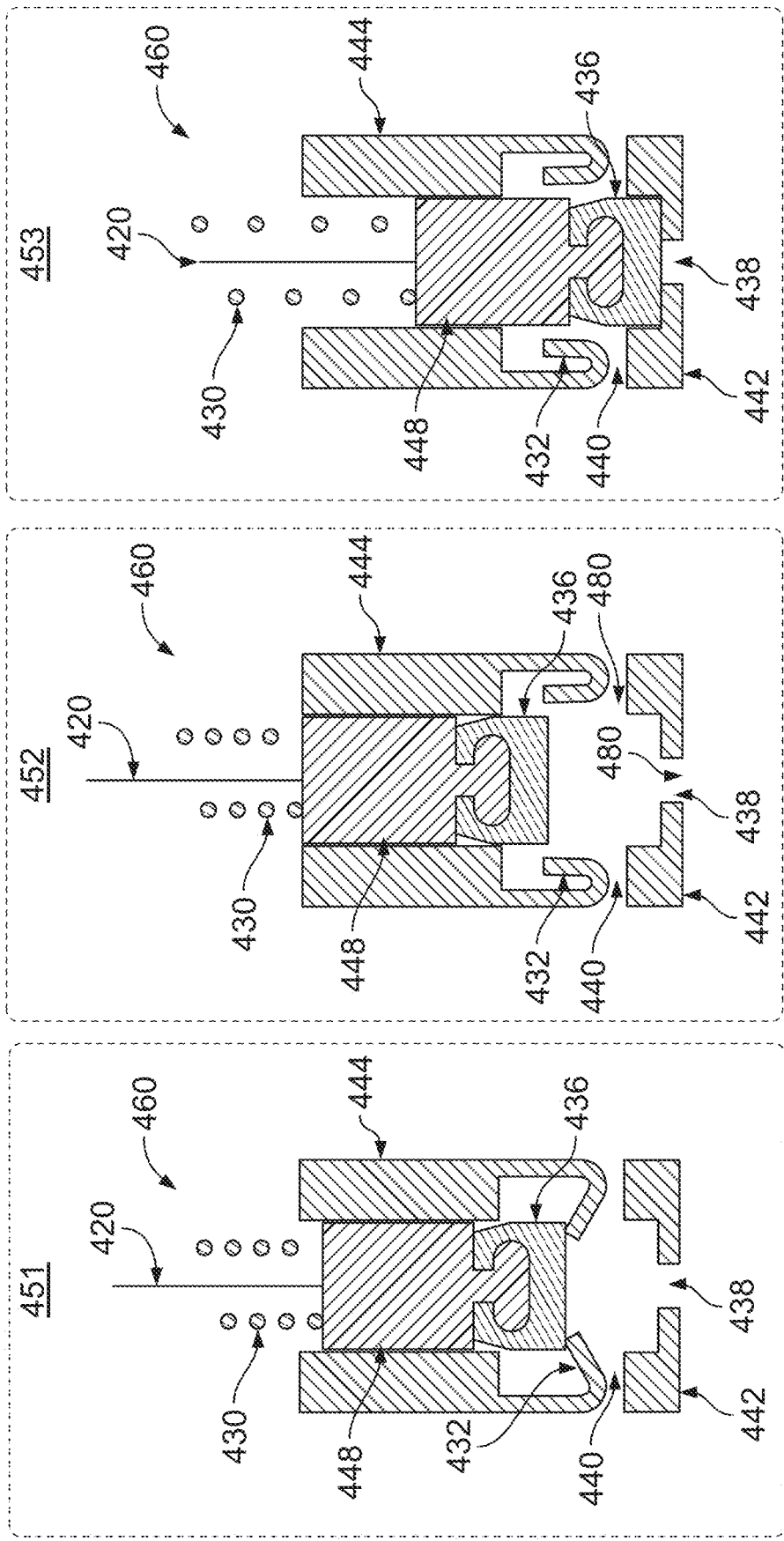
FIG. 4 illustrates a second sterilization process in accordance with the present disclosure.

FIG. 4 illustrates a second sterilization process in accordance with the present disclosure. As shown in FIG. 4, an exposure valve or valve system 460 may be configured to allow for selective exposure of a device region or component during a sterilization process and to be closed or sealed after completion of the sterilization process. In some embodiments, exposure valve 460 may be arranged in a fluid path (for instance, path 166a) or integrated into a device component (for instance, a wall of a reservoir, pump, and/or housing thereof).

A piston 448 having a sealing component 436 may be arranged within a cylinder 444. A pair of detent arms 432 may be arranged below piston 448 to engage a portion of piston 448, such as sealing component 436. A biasing component or spring (a return spring) 430 may bias piston 448 in a sealing direction, such as toward openings 440, 438 of exposure valve 460. Openings, such as an air vent to atmosphere 438 and/or fluid path 440, may provide a fluid path to the device region being sealed by exposure valve 460. Accordingly, if openings 438, 440 are sealed off by sealing component 436, then the device region associated with exposure valve 460 is also sealed from fluid.

In a first or pre-sterilization stage 451, biasing component 430 may push piston 448 in a sealing direction; however, detent arms 432 may engage piston 448 to hold or maintain piston in an unsealed position in which openings 438, 440 are not sealed by sealing component 436. In addition, piston 448 may hold detent arms 432 in an expanded position. For example, the biasing force of spring 430 may be sufficient to hold detent arms 432 in the expanded position.

In a sterilization stage 452, activation element 420 may be activated to pull piston 448 in an unsealing direction (for instance, in a direction away from openings 338, 340) and into a sterilization position. Detent arms 432 may retract to a retracted position. When activated, activation element 420 may hold piston 448 with a force greater than the biasing force of biasing component 430. Openings 438, 440 may be unsealed in sterilization stage 452, allowing fluid or other sterilization sources (for instance, light, radiation, and/or the like) to enter the device region associated with exposure system 460. For instance, EtO 480 may enter via vents 440 and travel into fluid path 438. In various embodiments, activation element 420 may remain activated during sterilization stage 452 to hold or otherwise maintain piston 448 in a position that keeps openings 438, 448 open.

In a sealing stage 453, activation element 420 may be deactivated. When activation element 420 is deactivated and stops holding piston 448, biasing component 430 pushes piston 448 in a sealing direction toward openings 438, 440 until sealing component 436 forms (or re-forms) a seal with openings 438, 440. Accordingly, in the sealing stage 453, the device region associated with exposure valve 460 is re-sealed as in pre-sterilization stage 451. In some embodiments, sealing component 436 may engage openings 438 and/or 440, cylinder 444, and/or another portion of exposure valve 460 to form a seal with or without relying on a biasing force from biasing component 430. Accordingly, piston 448 may not be moved in a manner that exposes openings 438, 440, and the device region associated with exposure valve 460 is permanently re-sealed after sterilization.

In some embodiments, portions of exposure valve 460 may be formed of an SMA material (for instance, nitinol). For example, in an alternative embodiment, detents 432 may be formed of an SMA material and may retract responsive to a stimulus, such as a sterilization temperature. Removal of the stimulus, such as returning exposure valve 460 to room temperature, may cause detents 432 to expand. In this embodiment, detents 432 would act as the activation element, such that activation element 420 and biased component 430 would not be required for exposure valve 460 to function according to various embodiments.

In this manner, some embodiments may provide a one-time use mechanism for allowing sterilization of a device. In one non-limiting example, an SMA wire is heated and activates, a seal pulls back allowing detent arms to retract. Once the SMA wire cools, the return spring pushes the assembly back into place sealing the air vents and/or other openings.

Included herein are one or more operation flows representative of exemplary methodologies for performing novel aspects of the disclosed technology. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

An operation flow may be implemented via components of a fluid delivery device and/or exposure valve, including in software, firmware, hardware, or any combination thereof. In software and firmware embodiments, an operation flow may include a logic flow implemented by computer executable instructions stored on a non-transitory computer readable medium or machine readable medium. Embodiments are not limited in this context.

Figure 5:
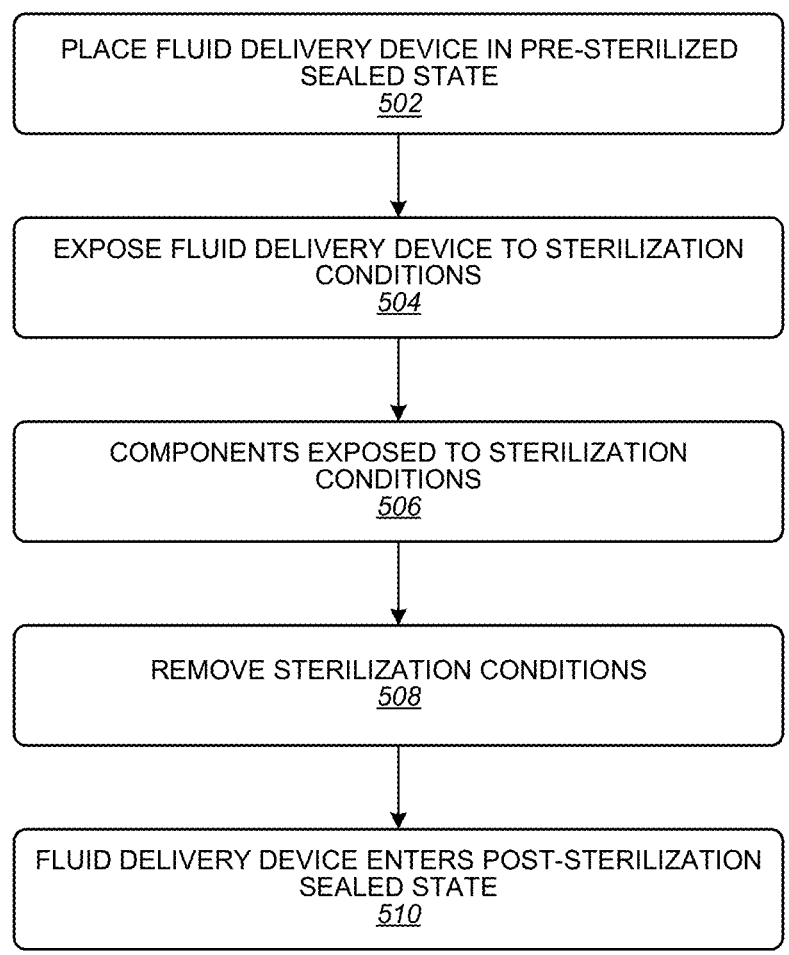
FIG. 5 illustrates an embodiment of workflow of a sterilization process in accordance with the present disclosure.

FIG. 5 illustrates an embodiment of an operation flow 900. Flow 900 may be representative of some or all of the operations executed by one or more embodiments described in the present disclosure, such as exposure valves 360 and/or 460 alone or in combination with manual steps performed by an operator.

At block 502, flow 500 may include placing a fluid delivery device in a pre-sterilized sealed state. For example, a fluid delivery device may be placed in an initial or pre-sterilized state such as states 251, 351, and/or 451. A fluid delivery device may be placed in the pre-sterilized sealed state after manufacturing to be ready for sterilization prior to final packaging and shipping.

Flow 500 may include exposing the fluid delivery device to sterilization conditions in block 504. For example, a fluid delivery device may be exposed to a sterilization temperature and/or other sterilization source, such as a sterilization fluid, radiation, and/or the like.

At block 506, components are exposed to sterilization conditions. For example, a sterilization device may enter a sterilization stage (for instance, such as states 252, 352, and/or 452) in response to the sterilization conditions to cause an exposure valve to open one or more openings (or maintain the openings in an open state) to allow a sterilization source to enter and sterilize a device region associated with the exposure valve.

Flow 500 may include removing the sterilization conditions at block 508. For example, a fluid delivery device may be removed from a sterilization temperature and, for instance, placed in a room temperature environment. In another example, a sterilization source, such as gamma radiation, may be removed from exposing the fluid delivery device.

At block 510, the fluid delivery device may enter a post-sterilization sealed state. For example, responsive to removal of the sterilization conditions, such as a sterilization temperature, the openings may be permanently sealed by a sealing component of an exposure valve (for instance, as depicted in states 253, 353, and/or 453).

Some examples of the disclosed devices and/or processes (or portions thereof) may be implemented, for example, using a storage medium, a computer-readable medium, or an article of manufacture which may store an instruction or a set of instructions that, if executed by a machine (for instance, processor or controller), may cause the machine to perform a method and/or operation in accordance with examples of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, programming code, and the like, implemented using any suitable high-level, low-level, object-oriented, visual, compiled and/or interpreted programming language. The non-transitory computer readable medium embodied programming code may cause a processor when executing the programming code to perform functions, such as those described herein.

Certain examples of the present disclosure were described above. It is, however, expressly noted that the present disclosure is not limited to those examples, but rather the intention is that additions and modifications to what was expressly described herein are also included within the scope of the disclosed examples. Moreover, it is to be understood that the features of the various examples described herein were not mutually exclusive and may exist in various combinations and permutations, even if such combinations or permutations were not made express herein, without departing from the spirit and scope of the disclosed examples. In fact, variations, modifications, and other implementations of what was described herein will occur to those of ordinary skill in the art without departing from the spirit and the scope of the disclosed examples. As such, the disclosed examples are not to be defined only by the preceding illustrative description.

Program aspects of the technology may be thought of as "products" or "articles of manufacture" typically in the form of executable code and/or associated data that is carried on or embodied in a type of non-transitory, machine readable medium. Storage type media include any or all of the tangible memory of the computers, processors or the like, or associated modules thereof, such as various semiconductor memories, tape drives, disk drives and the like, which may provide non-transitory storage at any time for the software programming. It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. A fluid delivery device, comprising:
    a device region fluidically coupled to a fluid path, the fluid path having at least one opening to allow a sterilization source to flow into the device region;
    an exposure valve arranged in the fluid path and configured to seal or unseal the at least one opening, the exposure valve comprising:
        a piston having a sealing component arranged at a first end facing the at least one opening,
        a biasing element configured to contact a second end of the piston, arranged opposite the first end, to bias the piston toward the at least one opening,
        an activation element configured to be activated by a stimulus to move the piston to a sterilization position during a sterilization process and deactivated responsive to removal of the stimulus to cause the piston to be moved into a sealing position, the at least one opening is unsealed when the piston is in the sterilization position to allow a sterilization source to sterilize the device region via the fluid path.

2. The fluid delivery device of claim 1, the activation element comprising a temperature-activated material.

3. The fluid delivery device of claim 1, the activation element comprising a shape memory alloy (SMA) wire.

4. The fluid delivery device of claim 1, the stimulus comprising one of a temperature, an electrical signal, light, or radiation.

5. The fluid delivery device of claim 1, the biasing element comprising a return spring.

6. The fluid delivery device of claim 1, the fluid delivery device comprising a wearable insulin pump.

7. The fluid delivery device of claim 1, the device region comprising at least one of a fluid pump or a fluid reservoir.

8. The fluid delivery device of claim 1, the piston having at least one locking element arranged at locking end to engage corresponding flanges to hold the piston in the sealing position after removal of the stimulus.

9. The fluid delivery device of claim 8, the locking element comprising at least one detent arm.

10. The fluid delivery device of claim 1, the exposure valve comprising at least one detent arm configured to be moved from an expanded position to a retracted position responsive to the piston being moved to the sterilization position.

11. A method of sterilizing a fluid delivery device, comprising:
arranging an exposure valve arranged in a fluid path fluidically coupled to a device region, the fluid path having at least one opening to allow a sterilization source to flow into the device region; and
operating the exposure valve to unseal the at least one opening during a sterilization process and to seal the at least one opening after the sterilization process, the exposure valve comprising:
a piston having a sealing component arranged at a first end facing the at least one opening,
a biasing element configured to contact a second end of the piston, arranged opposite the first end, to bias the piston toward the at least one opening,
an activation element configured to be activated by a stimulus to move the piston to a sterilization position during a sterilization process and deactivated responsive to removal of the stimulus to cause the piston to be moved into a sealing position, the at least one opening is unsealed when the piston is in the sterilization position to allow a sterilization source to sterilize the device region via the fluid path.

12. The method of claim 11, the activation element comprising a temperature-activated material.

13. The method of claim 11, the activation element comprising a shape memory alloy (SMA) wire.

14. The method of claim 11, the stimulus comprising one of a temperature, an electrical signal, light, or radiation.

15. The method of claim 11, the biasing element comprising a return spring.

16. The method of claim 11, the fluid delivery device comprising a wearable insulin pump.

17. The method of claim 11, the device region comprising at least one of a fluid pump or a fluid reservoir.

18. The method of claim 11, the piston having at least one locking element arranged at locking end to engage corresponding flanges to hold the piston in the sealing position after removal of the stimulus.

19. The method of claim 11, the locking element comprising at least one detent arm.

20. The method of claim 11, the exposure valve comprising at least one detent arm configured to be moved from an expanded position to a retracted position responsive to the piston being moved to the sterilization position.

* * * * *